United States Patent [19]

Yamamoto et al.

[11] Patent Number: 4,791,830
[45] Date of Patent: Dec. 20, 1988

[54] BALANCER OF RECIPROCATING MACHINE

[75] Inventors: Michinori Yamamoto; Shozo Tashiro; Satoshi Sakane; Toshiro Morita; Hiroshi Shiota; Tadashi Rokkaku; Keiichi Katayama, all of Hiroshima, Japan

[73] Assignee: Mitsubishi Jukogyo Kabushiki Kaisha, Tokyo, Japan

[21] Appl. No.: 945,294

[22] Filed: Dec. 17, 1986

[30] Foreign Application Priority Data

Feb. 17, 1986 [JP] Japan .................................. 61-30936

[51] Int. Cl.⁴ .................................................. B30B 5/00
[52] U.S. Cl. ....................................... 74/603; 100/257; 72/454
[58] Field of Search ............... 74/589, 590, 591, 454, 74/603, 604; 100/282, 257; 123/132 B, 192 R; 83/530

[56] References Cited

U.S. PATENT DOCUMENTS

| | | | |
|---|---|---|---|
| 3,450,038 | 6/1969 | Kraft et al. | 100/257 |
| 3,785,282 | 1/1974 | Kamelander | 100/257 |
| 4,095,522 | 6/1978 | Drungil | 100/214 |
| 4,603,573 | 8/1986 | Ganago et al. | 74/454 |
| 4,630,516 | 12/1986 | Koch et al. | 83/530 |

Primary Examiner—Gary L. Smith
Assistant Examiner—Vinh Luong
Attorney, Agent, or Firm—Wenderoth, Lind & Ponack

[57] ABSTRACT

A balancer of a reciprocating machine having crank mechanisms includes an adjusting weight having one end supported by a reciprocating portion of a crank mechanism for the balancer. An adjusting weight support rotatably supports the other end of the adjusting weight with respect to a stationary portion of a body frame. The adjusting weight support is equipped with a weight support position altering mechanism for permitting alteration of the support position of the adjusting weight.

7 Claims, 3 Drawing Sheets

BALANCER OF RECIPROCATING MACHINE

BACKGROUND OF THE INVENTION

1. Field of the Invention

This invention relates to a balancer for a reciprocating machine including a crank, such as a crank press, for balancing unbalanced inertia forces in the reciprocating machine.

2. Description of the Prior Art

Crank mechanisms are generally classified into two types: one type being characterized in that a crank pin off-centered with respect to a crank shaft is supported by a crank arm, and the other being characterized in that a portion of a crank shaft is made eccentric to define an eccentric shaft portion. In either type, an eccentric rotary portion of the crank mechanism is connected via a connecting rod with a reciprocating member to convert rotary motion into reciprocating motion.

A crank press is known to be a typical reciprocating machine employing such crank mechanisms. When such a machine is operated at a high speed, vibration arises owing to unbalanced inertia force. A balancer normally is used as a measure to prevent occurrence of such vibration. A typical crank press employing a conventional balancer will now be described with reference to FIG. 5 which is a simplified block diagram and FIG. 6 which is a diagram illustrative of a motion mechanism.

In these drawings, reference numeral 1 designates a drive motor, 2 a belt, 3 a pulley, 4 a crank shaft, 5a and 5b crank arms, 6a and 6b connecting rods, 7 balancers, 8 a slider on which an upper metal mold 9 is secured, 10 a lower metal mold, 11a and 11b journal bearings, 12 an upper casing, 13 a machine body frame, and 14a and 14b guides for a reciprocating member. The rotary motion of the motor 1 is transmitted via the belt 2 and the pulley 3 to the crank shaft 4 to rotate the crank arms 5a and 5b, whereby such rotation is converted into reciprocating motion of the balancers 7 and the slider 8 in the direction of an arrow Z.

Symbolizing the parameters shown in the drawings as follows:

$r_1$: the crank radius for the slider
$r_2$: the crank radius for the balancer
$l_1, l_2$: the length of each connecting rod
$\lambda_1 = r_1/l_1, \lambda_2 = r_2/l_2$
$\omega$: the angular velocity of rotation
t: time
$\theta = \omega t$
$m_1$: the mass of the slider
$m_2$: the mass of the upper metal mold
$M_1 = m_1 + m_2$: the sum of mass of the reciprocating sections
$M_2$: the sum of mass of the balancers 7
$\alpha_1$: the acceleration of the composite center of gravity of the slider 8 and the upper metal mold 9, the unbalanced inertia force (the vibromotive force) of the crank press is due in part to the mass $M_1$ of the reciprocating sections such as the slider 8 and otherwise to an unbalance in the gyrating (rotating) mass of the crank arms $r_1$ and $r_2$ and the like. Among the above the unbalance of the gyrating mass is balanced by balance weights (not shown) attached to the sides opposite to the crank arms $r_1$ and $r_2$. Hence, this unbalance is not considered in the description herein.

On the other hand, the vibromotive force $F_1$ due to the mass $M_1$ of the reciprocating sections, such as the upper metal mold 9 and the slider 8, is expressed as $$F_1 = -M_1\alpha_1 \approx -M_1r_1\omega^2(\cos\theta + \lambda_1\cos 2\theta) \quad (1)$$

In contrast with the above, each balancer 7 is connected with a respective crank arm 5b which has a phase difference of 180° with respect to the crank arms 5a of the slider 8, hence, the vibromotive force $F_2$ of the balancers 7 is expressed as $$F_2 = M_2r_2\omega^2(\cos\theta + \lambda_2\cos 2\theta) \quad (2)$$

In each of the above equations (1) and (2), the quadratic vibromotive force represented by the second term is remarkably small as compared with the linear vibromotive force represented by the first term, and hence, no description is given here with respect thereto.

Accordingly, the balance equation between the linear vibromotive forces $F_1$ and $F_2$ as derived from the equations (1) and (2) is:

$$-M_1r_1\omega^2\cos\theta + M_2r_2\omega^2\cos\theta = 0 \quad (3)$$

Dividing both sides by $\omega^2\cos\theta$, the following is obtained:

$$-M_1r_1 + M_2r_2 = 0 \quad (4)$$

Thus, an unbalanced amount f to be borne by the adjusting weight of the balancers 7 is expressed as $$f = M_2r_2 = M_1r_1 \quad (5)$$

From the above expression (5) it becomes apparent that as the sizes of the crank radiuses $r_1$ and $r_2$ are determined, the weight (the mass) of the balancers 7 can easily be determined and the linear vibromotive force can perfectly be balanced.

In the press, however, the features of the metal molds 9 and 10 generally vary, depending upon the specification of finished products, and their weight also varies. Thus, in the conventional press, it is necessary to perform manual adjustment such that the weight of the balancers 7 (or the weight of the slider 8) matches the weight (or the mass) of the upper metal mold 9.

In this connection, since the balancers 7 are housed inside the upper casing 12 of the machine body frame 13, large amounts of manpower and of time are required for the operation of attaching/detaching the balance weight, and production efficiency is lowered.

SUMMARY OF THE INVENTION

It is an object of the present invention to provide a balancer the weight of which can be increased or decreased accurately in short time by a one-touch action of a worker on the occasion of a variation in the mass of a reciprocating section such as a slider that appears upon exchange of a metal mold, to thereby stably prevent the occurrence of linear vibration.

To solve the problems of the prior art and achieve the foregoing object, the present invention provides a balancer of a reciprocating machine including crank mechanisms, which balancer comprises an adjusting weight having one end supported by a reciprocating portion of a crank mechanism for the balancer, and an adjusting weight supporting means for rotatably supporting the other end of the adjusting weight with respect to a stationary portion of a body frame, wherein the adjusting weight supporting means is equipped with a weight support position altering mechanism for permitting alteration of the support position of the adjusting weight.

The thus configured balancer of the reciprocating machine is operated under the condition that support of the adjusting weight is shared between the reciprocating portion of the crank mechanism for the balancer and the stationary portion of the body frame, and the ratio of such sharing is changed as the support position of the adjusting weight on the side of the stationary portion is altered by the support position altering mechanism, whereby the weight of the adjusting weight element imposed on the reciprocating portion is changed.

DESCRIPTION OF THE PREFERRED EMBODIMENT

Figure 1:
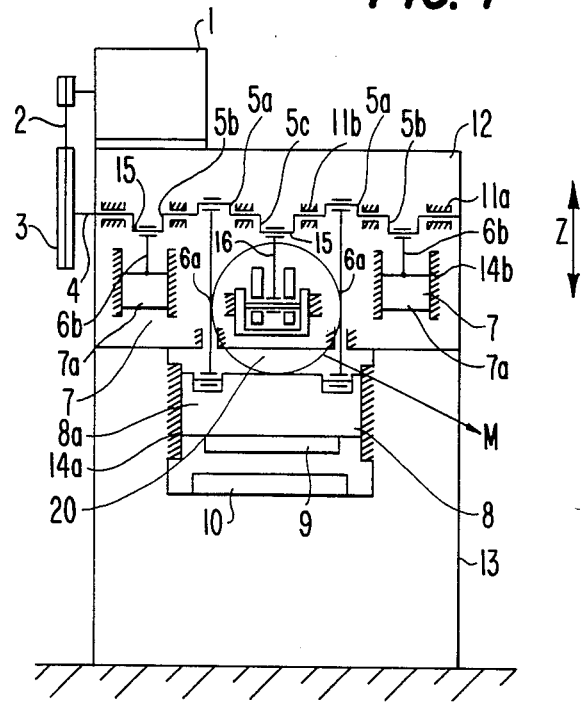
FIG. 1 is a simplified overall block diagram of a press according to an embodiment of the present invention.
Figure 2:
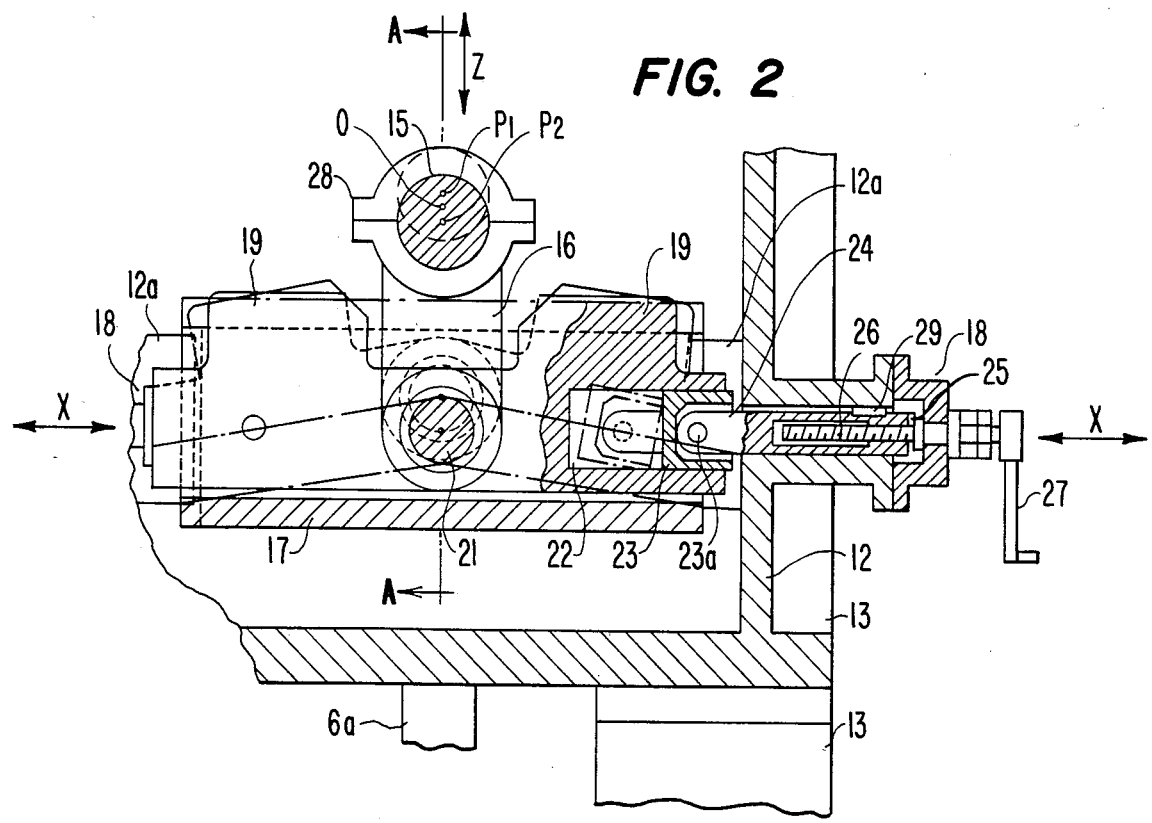
FIG. 2 is a side view, partly in cross section, of a portion M of FIG. 1.
Figure 3:
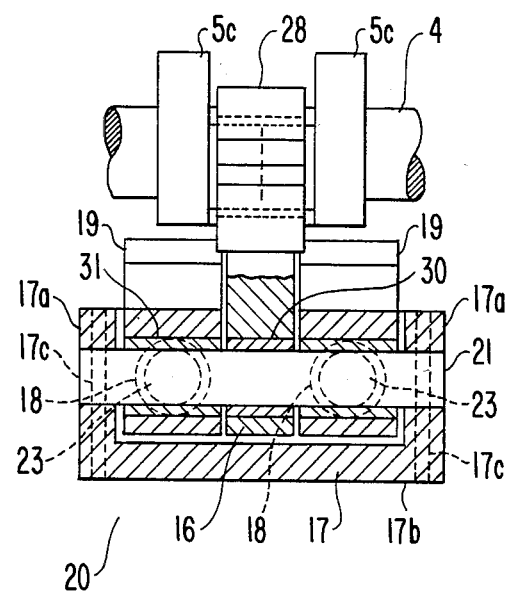
FIG. 3 is a sectional view taken in the direction of the arrows along line A—A in FIG. 2.
Figure 4:
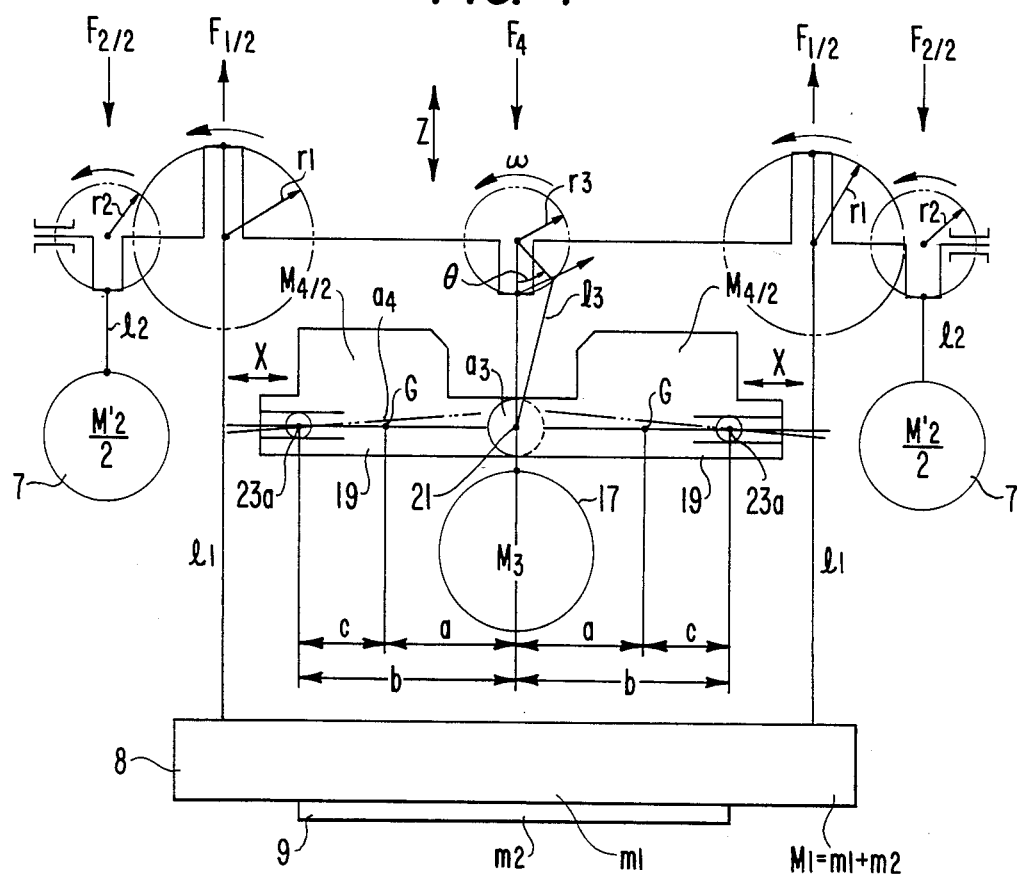
FIG. 4 is a diagram illustrative of the principle of operation of the device of the present invention.
Figure 5:
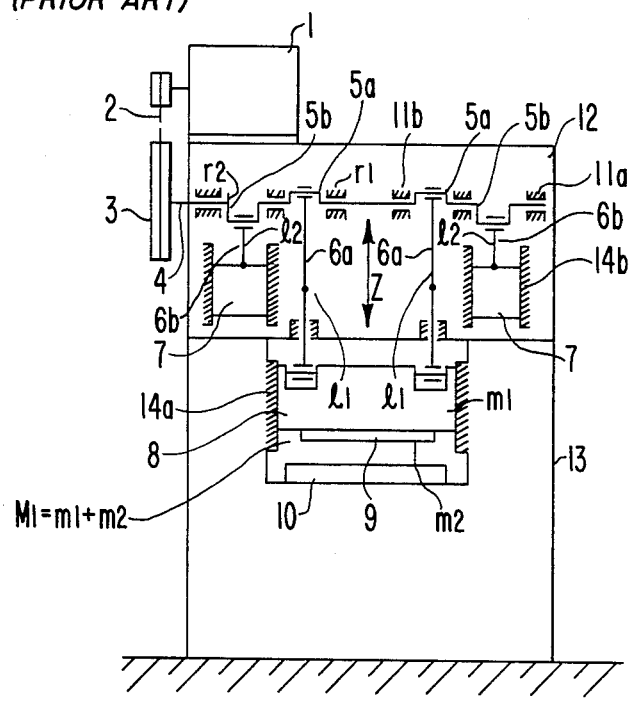
FIG. 5 is a simplified overall block diagram of a conventional press.
Figure 6:
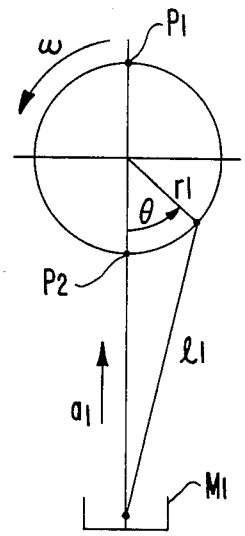
FIG. 6 is a diagram illustrative of the motion mechanism of FIG. 5.

An embodiment of the present invention will now be described in greater detail with reference to FIGS. 1 through 4 in which portions identical with those of the conventional device shown in FIG. 5 bear the same reference numerals as in FIG. 5, with their description omitted.

The illustrated embodiment of the device of the invention comprises, as shown in the drawings, a crank shaft 4, a crank mechanism for a main balancer which is located in a central portion of a slider 8 functioning as a reciprocating member and is composed of a crank pin 15 and a crank arm 5c having a phase difference of 180° in the direction of rotation with respect to crank arms 5a for the slider 8, and the aforementioned main balancer 20 for unbalanced inertia force which is also located in the central portion and is composed of a connecting rod 16 rotatably attached to the crank pin 15, a fixed weight 17 rotatably attached to the distal end of the connecting rod 16, and a pair of adjusting weights 19 each supported at one end by the connecting rod 16 and at the other end via an adjusting weight supporting means 18 by body frame 13. The crank shaft 4 is equipped at either end position with a pair of subbalancers 7 each composed of a connecting rod 6b rotatably attached to a crank pin 15 of a crank arm 5b having the same phase as that of the main balancer 20 and a fixed weight 7a rotatably pin-connected with the distal end of the connecting rod 6b. The distal end of connecting rod 16, on the side opposite to the crank pin 15 the connecting rod 16 rotatably holds a connecting pin 21 extending orthogonally to the axial line of the connecting rod 16 such that both ends of the pin 21 project laterally. Each end of the pin 21 is fixed to a central portion of a corresponding side wall 17a of the fixed weight 17 which is substantially U-shaped in cross section. A bottom plate surface 17b of the fixed weight 17 is made parallel with the axial line of the connecting pin 21 (see FIG. 3). The end face of each side wall 17a of the fixed weight 17 is formed with a guide groove 17c extending in the direction of reciprocating motion (in the vertical or Z direction in the drawings). Each guide groove 17c slidably engages with a guide plate 12a projecting from the internal surface of upper casing 12 of the body frame 13.

On the other hand, the paired adjusting weights 19 are disposed symmetrically on the projecting portions of the connecting pin 21 with the connecting rod 16 therebetween. One end of each adjusting weight 19 is rotatably supported by the connecting pin 21, with the other end being slidably supported, via a guide hole 22 formed therein to extend in a direction orthogonal to the axial line of the connecting pin 21 (in the direction of the arrow X), by a piston 23 of the corresponding adjusting weight supporting means 18 attached to the casing 12. The hole 22 is designed such that the piston 23 can support the adjusting weight 19 within its extent of movement while moving between a center-of-gravity position and the marginal end of the adjusting weight 19.

The adjusting weight supporting means 18 is composed of the aforementioned piston 23, a piston rod 24 rotatably coupled with a piston pin 23a attached to the piston 23, and a weight support position altering mechanism 25 for moving the piston within hole 22. The weight support position altering mechanism has, in the illustrated embodiment, the configuration of a threaded shaft 26 meshing with a threaded hole of the piston rod 24 and driven by a handle 27 provided outside the casing 12. Instead of using the foregoing configuration, this mechanism can also adequately be realized by another configuration in which the piston 23 can be moved in the direction of the arrow X and stationarily held at any desired position thus attained.

On the other hand, the subbalancer 7 is identical in configuration with that well known in the art, as described hereinabove.

In the drawings, reference numeral 28 designates a crank pin bearing, 29 a key for preventing rotation of the piston rod 24, and 30 and 30 bearings.

In the foregoing configuration, each of the weights 7a, 17 and 19 and each of the crank radiuses $r_2$ and $r_3$ (FIG. 4) is set such that the amount of balance borne by the subbalancers 7 can absorb the linear vibromotive force of the slider 8 and the amount of balance of the main balancer 20 can absorb the linear vibromotive force of the upper metal mold 9. Specifically, the fixed weight 17 included in the main balancer 20 is set to absorb the linear vibromotive force due to the upper metal mold 9 which is smallest in weight, whereas the adjusting weights 19 are configured to absorb the linear vibromotive force due to a change in weight of the upper metal mold 9 caused by alteration of the specification of the metal mold.

The linear vibromotive force due to exchange of metal molds can easily be absorbed by moving or changing, fore-and-aft in the direction of the arrow X through control of the handles 27, the positions of the pistons 23, i.e. the distance b (see FIG. 4) from the center of the connecting pin 21 to the support points 23a of the adjusting weights 19, so as to obtain a predetermined setting value. The foregoing will now be described in greater detail with reference to FIG. 4 showing the principle of operation.

Symbolizing the parameters shown in FIG. 4 as follows:

$r_3$: the crank radius of the main balancer $l_3$: the length of the connecting rod 16 of the main balancer $\lambda_3 = r_3/l_3$ $M_2'$: the mass of the subbalancers $M_3$: the mass of the fixed weight 17 of the main balancer $M_4$: the mass of the adjusting weights 19 of the main balancer $\Delta m$: the maximum variable mass of the upper metal mold 9

$\Delta mx$: any variable mass of the upper metal mold 9

$F_4$: the vibromotive force due to the adjusting weights 19 of the main balancer $\Delta Fx$: the vibromotive force due to the variable mass of the upper metal mold 9

$G$: the center-of-gravity point of each adjusting weight 19

$\alpha_3$: the acceleration in the direction of reciprocating motion at the distal end of the connecting rod 16 of the main balancer $\alpha_4$: the acceleration in the direction of reciprocating motion at the center of gravity of each adjusting weight 19

$a$: the distance between the shaft center of the connecting rod 16 of the main balancer and the center of gravity of each adjusting weight 19

$b$: the distance from the shaft center of the connecting pin 21 of the main balancer 20 to the center point of the piston 23 of each adjusting weight supporting means (the weight support point)

$c = b - a,$ the following relationship is obtained from the balance condition of the vibromotive force due to a change in weight of the upper metal mold:

$$F_4 = \Delta Fx \tag{6}$$

Because the acceleration $\alpha_4$ at the center G of gravity of each adjusting weight 19 is expressed as $$\alpha_4 = \frac{c}{b} \times \alpha_3 = \left(\frac{b-a}{b}\right) \times \alpha_3 \tag{7}$$

from the foregoing equations (3) and (4), the following relationship is obtained from the equations (6) and (7):

$$F_4 = \left(1 - \frac{a}{b}\right) M_4 \, r_3 = \Delta mx \cdot r_1 = \Delta Fx \tag{8}$$

Since the equation (8) is written as $$\left(1 - \frac{a}{b}\right) = 0 \sim \frac{\Delta m \cdot r_1}{M_4 \cdot r_3} \tag{9}$$

Accordingly, by previously and appropriately setting a, $M_4$ and $r_3$ included in the above equation (9), and varying the position of the support point b of each adjusting weight 19 within a range of $b \geq a$, it is possible to increase and decrease, correspondingly to a change in weight of the upper metal mold 9, the amount of balance of the adjusting weights 19 exerted on the end of the connecting rod 16 of the main balancer, whereby the vibromotive force can easily be absorbed. For example, as the support position is moved progressively toward the side opposite to the connecting pin about the position of the center G of gravity, the amount of balance of each adjusting weight 19 at the end of the connecting rod is increased correspondingly.

With regard to setting the position b of the aforementioned support point, it is possible easily to provide a digital display thereof on the basis, for example, of the number of revolutions of the handle 27 for shifting the piston 23. Thus, if the relationship between the weight of the upper metal mold and the position b is previously determined, adjustments of the setting of the position b can easily be achieved in a very short time only by turning the handle 27 with respect to a display scale.

Although the illustrated device includes one pair of adjusting weights 19 disposed side by side for the main balancer 20, one adjusting weight may be provided on one side. Although two subbalancers 7 are included, one or more than two subbalancers may be provided. The installation positions of the main balancer and the subbalancers should not be limited to those illustrated in the above embodiment. The balancers, except for the main balancer 20, may be omitted depending upon the existing conditions. The main balancer include only the adjusting weight and may be put in operation in conjunction with the subbalancer.

Although the illustrated embodiment uses a piston system as the manner of supporting the adjusting weight by the use of the adjusting weight supporting means (the weight adjusting unit) 18, the present invention should not be limited to such system and can adopt even a configuration in which, while the adjusting weight 19 is reciprocating, the support position of that weight 19 can be altered under the condition that its movement in the direction Z of reciprocating motion is restricted with respect to a supporting member thereof.

The balancer of the reciprocating machine according to the present invention is configured as described above and characterized in that the reciprocating portion of the crank mechanism for the balancer rotatably holds one end of the adjusting weight and the other end of the adjusting weight is rotatably supported with respect to a stationary portion of the body frame, whereby the weight of the adjusting weight element can be shared between the body frame and the crank mechanism for the balancer. Further, the support position of the adjusting weight on the side of the body frame is altered by the weight support position altering mechanism to change the ratio of such sharing, whereby the weight of a balance weight element imposed on the crank mechanism for the balancer can be adjusted. Thus, the operation of attaching/detaching the balance weight element, which must be performed in the prior art each time the weight of the reciprocating motion section changes, for example, at the time of exchange of press metal molds, is unnecessary whereby the amount of labor can be reduced and production efficiency can be enhanced.

What is claimed is:

1. In a balancer for balancing the unbalanced inertia force of a reciprocating machine of the type including a reciprocating member for converting rotary motion into reciprocating motion by the use of a first crank mechanism, said balancer including at least one supporting balance weight on a reciprocating portion of a second crank mechanism for said balancer that has an eccentric setting angle shifted 180° in phase with respect to the eccentric angle of the first crank mechanism, the improvement comprising:
- at least one adjusting weight having a first end supported by said reciprocating portion of said second crank mechanism;
- an adjusting weight supporting means for rotatably supporting a second end of said adjusting weight with respect to a stationary portion of a body frame; and
- weight support position altering mechanism means fixedly mounted on said stationary portion of said body frame for selectively altering the position of support of said second end of said adjusting weight by said adjusting weight supporting means and thereby for adjusting the distance between the positions of support at said first and second ends of said adjusting weight.

2. The improvement claimed in claim 1, further comprising a connecting pin rotatably connected to said reciprocating portion of said second crank mechanism, said first end of said adjusting weight being rotatably mounted on said connecting pin.

3. The improvement claimed in claim 2, wherein opposite ends of said connecting pin are fixed to a fixed weight of said balancer.

4. The improvement claimed in claim 2, comprising two said adjusting weights disposed symmetrically on said connecting pin.

5. The improvement claimed in claim 1, wherein said second end of said adjusting weight has therein an elongated guide hole, and said adjusting weight supporting means comprises a piston slidably mounted in said guide hole, and a piston rod rotatably connected to said piston.

6. The improvement claimed in claim 5, wherein said weight support position altering mechanism means is connected to said piston rod to selectively move said piston within said guide hole.

7. The improvement claimed in claim 6, wherein said weight support position altering mechanism means comprises a threaded shaft threadingly meshing with threads of said piston rod, and a handle rotatably mounted with respect to the stationary portion of the body frame for rotating said threaded shaft to thereby move said piston rod axially of said threaded shaft.

* * * * *